United States Patent [19]

Hashimoto et al.

[11] Patent Number: 4,556,779

[45] Date of Patent: Dec. 3, 1985

[54] TEMPERATURE CONTROL ARRANGEMENT FOR HEAT ROLLER

[75] Inventors: Kaoru Hashimoto, Toyokawa; Kenzo Nagata, Okazaki, both of Japan

[73] Assignee: Minolta Camera Kabushiki Kaisha, Osaka, Japan

[21] Appl. No.: 472,171

[22] Filed: Mar. 3, 1983

[30] Foreign Application Priority Data

| Mar. 18, 1982 | [JP] | Japan | 57-43958 |
| May 20, 1982 | [JP] | Japan | 57-86219 |
| May 21, 1982 | [JP] | Japan | 57-86813 |
| Sep. 20, 1982 | [JP] | Japan | 57-164510 |

[51] Int. Cl.$^4$ ............... G03G 15/00; G05D 23/27; H05B 1/00
[52] U.S. Cl. ............... 219/216; 219/471; 219/502; 432/60; 355/3 FU
[58] Field of Search ............... 219/216, 469, 470, 471, 219/502; 355/3 FU; 374/121, 129, 130, 132, 133; 338/18; 432/60, 228

[56] References Cited

U.S. PATENT DOCUMENTS

| 3,369,106 | 2/1968 | Troll | 219/469 |
| 3,742,191 | 6/1973 | Poole | 219/469 |
| 3,849,628 | 11/1974 | Abowitz | 219/216 |
| 4,245,143 | 1/1981 | Miura | 374/121 |

FOREIGN PATENT DOCUMENTS

| 1458475 | 11/1966 | France | 374/121 |
| 57-11537 | 1/1982 | Japan | |
| 150266 | 9/1962 | U.S.S.R. | 374/121 |

OTHER PUBLICATIONS

Nikkei Electronics, 1980, 7.21, pp. 114 to 127.
Denshi Gijutsu (Electronic Technique), vol. 21, No. 2, pp. 41 to 46.
Denshi Tembo (Electronic Prospect), pp. 57 to 62.
Electronic Communication Society, Research Report, vol. 80, No. 34, ED80-27.
National Technical Report, vol. 26, No. 3, pp. 413 to 423.

Primary Examiner—Roy N. Envall, Jr.
Assistant Examiner—Teresa J. Walberg
Attorney, Agent, or Firm—Wenderoth, Lind & Ponack

[57] ABSTRACT

A temperature control arrangement for a heat roller, which includes an infrared sensor unit disposed in the vicinity of the heat roller and including a pyroelectric infrared sensor, a chopper mechanism and a reference temperature measuring heat sensitive element, a set temperature signal generation circuit for the heat roller, a comparison circuit for comparing a temperature detection value of the heat roller as detected by the sensor unit with the set temperature signal from the set temperature signal generation circuit, and a control circuit for subjecting a heater element of the heat roller to on/off control based on a comparison signal of the comparison circuit.

15 Claims, 38 Drawing Figures

Infrared ray input

Variation of surface charge

Sensor output

Chopper frequency (Hz)

Fig. 8(a) Pulse motor drive signal
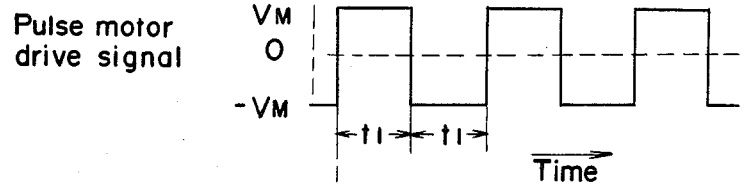
Fig. 8(b) Output of infrared sensor (after passing amp. and filter circuit)
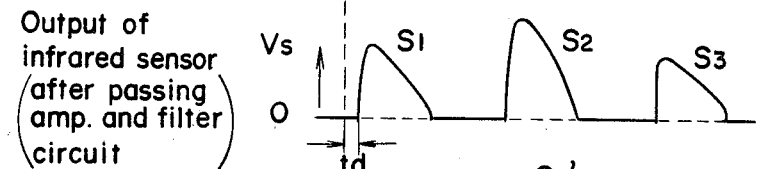
Fig. 8(c) Peak value hold
Fig. 8(d) Reset pulse
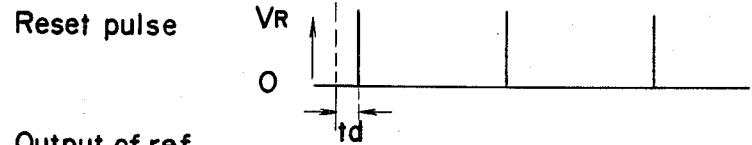
Fig. 8(e) Output of ref. temp. measuring element
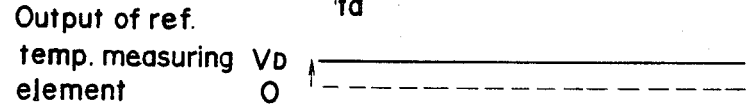
Fig. 8(f) Output of infrared sensor unit (Vs+VD)
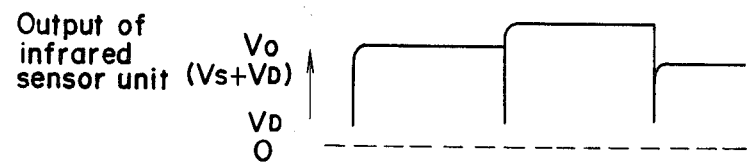

*Fig. 11(a)*
Pulse motor drive signal
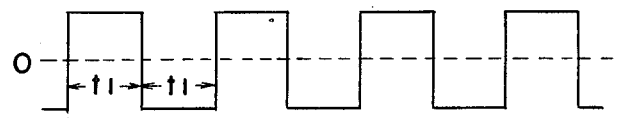
*Fig. 11(b)*
Infrared sensor unit output
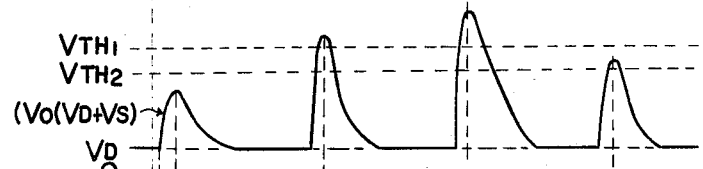
*Fig. 11(c)*
Output of comparison circuit
(Comparison between $V_{TH1}$ and $V_o$)
*Fig. 11(d)*
Clock pulse signal
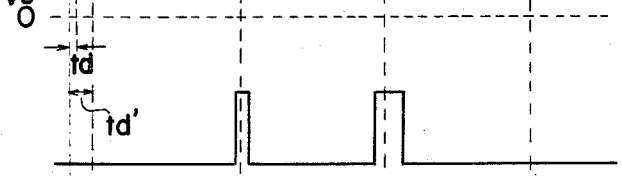
*Fig. 11(e)*
Heater signal
*Fig. 11(c')*
Output of comparison circuit
(Comparison between $V_{TH2}$ and $V_o$)
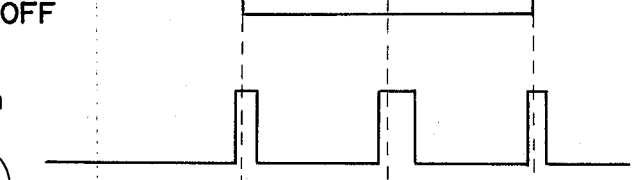
*Fig. 11(e')*
Heater signal

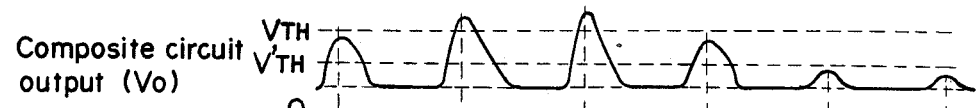

TEMPERATURE CONTROL ARRANGEMENT FOR HEAT ROLLER

BACKGROUND OF THE INVENTION

The present invention generally relates to a temperature control apparatus and more particularly, to a temperature control arrangement for a heat roller which is used for fixing toner onto a copy material such as copy paper through heating, for example, in the electrophotographic copying apparatus. More specifically, the present invention relates to a temperature control arrangement of the above described type employing an infrared sensor unit which includes a pyroelectric infrared sensor, a chopper mechanism and a reference temperature measuring heat sensitive element.

Commonly, in an electrophotographic copying apparatus, for achieving a sufficient fixing performance by a fixing device employing a heat roller, it is necessary to effect control for maintaining the surface temperature (i.e.—fixing the temperature) of the heat roller at a predetermined value, since a faulty fixing may result if the fixing temperature is too low, while inconveniences such as the so-called offset toner phenomenon, etc., take place on the heat roller, if the fixing temperature is excessively high.

Conventionally, for the temperature control as described above, it has been a general practice to provide a heat sensitive element such as a thermistor or the like, directly contacting the surface of the heat roller (i.e.—a contact type detection) or confronting said surface through a very small space (i.e.—a non-contact type detection) so as to subject a heater element for said heat roller to an on/off control based on the temperature value detected by the heat sensitive element.

However, in the control method employing the heat sensitive element as described above, although the contact type detection has an advantage in that ripple or variation of the control temperature may be reduced owing to the instantaneous detection of the temperature of the heat roller, with a simultaneous suppression of an overshoot at the rising of the temperature of said heat roller, there are inconveniences in that the temperature detecting efficiency is undesirably lowered, with a reduction of response due to the soiling of the detecting portion caused by toner adhering to the surface of the heat roller, paper dust, oil, etc., and in that the surface of the heat roller tends to be damaged by the heat sensitive element held in contact therewith.

On the contrary, the non-contact type detection has advantages in that it is free from soiling at the detecting portion and damages to the heat roller surface, but there are shortcomings in that the heat sensitive element is readily affected by atmospheric air, with a poor thermal response due to the presence of an air layer between the heat sensitive element and the surface of the heat roller, thus making it difficult to effect an accurate temperature detection, while the ripple or variation in the controlled temperature tends to be large, resulting in the formation of fixing irregularities and faulty fixing, and thus, a high accuracy is required for the installation of the heat sensitive element.

In other words, under the present situation, the contact type detection and non-contact type detection respectively have merits and demerits as described so far, and therefore, a temperature detection system simultaneously having the merits of both detection types, with the elimination of the demerits thereof, i.e.—more specifically, a temperature detection system of a non-contact type which is free from the influence of the atmosphere has been needed.

Meanwhile, in a conventional fixing device, copy paper jamming arising from copy paper wound around the heat roller within the fixing device, etc. is arranged to be detected by a microswitch or a photo-interrupter or photo-sensor provided in the fixing device, but the former arrangement with the microswitch has a disadvantage caused by poor contact at contact portions thereof due to the vaporized fixing oil, while the latter arrangement employing the photo-interrupter has a problem with respect to its heat resistance.

SUMMARY OF THE INVENTION

Accordingly, an essential object of the present invention is to provide a temperature control arrangement for a heat roller, which is capable of controlling the surface temperature of the heat roller at a predetermined value at all times through the employment of a detecting means of the non-contact type which is free from fluctuations in the temperature detecting level due to the influence of the atmosphere, for example, by high or low atmospheric temperatures, or variations thereof, the flow of air suddenly introduced therearound, etc., with the simultaneous prevention of the obstruction of the normal temperature detection caused by a sudden heat stream and the adhesion of foreign matter with respect to a light receiving portion of a sensor.

Another important object of the present invention is to provide a temperature control arrangement of the above described type which is simultaneously provided with a function for accurately detecting copy paper jamming within the fixing device.

A further object of the present invention is to provide a temperature control arrangement of the above described type which is simple in construction and accurate in functioning, and can be readily incorporated at a low cost in fixing devices which are provided with heat rollers.

In order to accomplish these and other objects according to one preferred embodiment of the present invention, there is provided a temperature control arrangement for a heat roller which includes an infrared sensor unit disposed in the vicinity of the heat roller and including a pyroelectric infrared sensor, a chopper mechanism and a reference temperature measuring heat sensitive element, a set temperature signal generating means for the heat roller, a comparing means for comparing a temperature detection value of the heat roller as detected by said sensor unit with the set temperature signal from said set temperature signal generating means, and a control means for subjecting a heater element of said heat roller to an on/off control based on a comparison signal from said comparing means.

By the arrangement according to the present invention as described above, an improved temperature control arrangement for a heat roller has been presented, with a substantial elimination of the disadvantages inherent in the conventional arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 8(a) to 8(f) are waveform diagrams for explaining the functioning of the heat roller temperature control arrangment of FIG. 7;

FIGS. 11(a) to 11(e') are waveform diagrams for explaining the functioning of the heat roller temperature control arrangement of FIG. 10;

FIGS. 15(a) to 15(c') are waveform diagrams for explaining the functioning of the heat roller temperature control arrangement of FIG. 14;

Before the description of the present invention proceeds, it is to be noted that like parts are designated by like reference numerals throughout the accompanying drawings.

DETAILED DESCRIPTION OF THE INVENTION

Figure 1A:
FIGS. 1(a) to 1(c) are diagrams for explaining the temperature detecting mechanism utilized through the employment of a pyroelectric infrared sensor.

According to the present invention, it has been ensured that the pyroelectric infrared sensor as employed in the heat roller temperature control arrangement is small with respect to a ripple or variation in the control temperature as compared with a conventional thermistor of the non-contact type arrangement, while an overshoot during the rising of the temperature of the heat roller is suppressed so as to be sufficiently small, with a response of the sensor being extremely favorable.

Referring now to the drawings, a temperature control arrangement for a heat roller according to one preferred embodiment of the present invention will be described hereinbelow.

Firstly, the operation of a pyroelectric infrared sensor which is to be employed in the temperature control arrangement according to the present invention will be explained.

All objects which are at temperatures which are above an absolute zero point (0° K) emit infrared (electromagnetic wave) energy corresponding to their absolute temperatures, said energy be emitted from the surface thereof. The energy per unit wavelength interval which is discharged from a black body at an absolute temperature T° K into a hemisphere at a wavelength λ may be represented by the following equation based on Plank's Law.

$$W\lambda = \frac{C1}{\lambda^5}(e^{C2/\lambda T} - 1)^{-1} (W \cdot cm^2 \cdot \mu m^{-1}) \quad (1)$$

where
C1: λ3.740×10⁻¹² (W·cm²)
C2: 1.438 (cm·deg)

The energy as described above varies according to the wavelength, and its maximum value is denoted in the following equation by Wien's law.

λm=C3/T
where C3:2890 λm·deg

Meanwhile, all the energy radiated from the black body into the hemisphere may be obtained through the integration of the equation (2) with respect to the wavelengths from 0 to infinity ∞, and is represented by $$W = \int_0^\infty W\lambda \cdot dx = \sigma T^4 \quad (3)$$

where σ:5.67 ×10⁻¹²W/cm²·deg⁴
Stefan-Boltzmann's constant and the above equation (3) is referred to as Stefan-Boltzmann's fourth power law.

On the other hand, the pyroelectric effect is a phenomenon in which electrical charge is produced on a surface of a crystal when part of the crystal is heated. The surface of a pyroelectric material having a self-polarization captures floating charges in the atmosphere for maintaining electrical neutrality. Upon the subjection of the pyroelectric material to temperature variation of ΔT, the magnitude of its internal self-polarization is varied. In the above case, since the surface charge cannot copy with the temperature variation so quickly as in the self-polarization, an electrical charge equivalent to the variation of the self-polarization may be observed for a short period of time on the surface of the pyroelectric material.

Figure 1B:
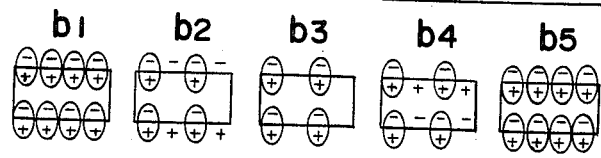
Figure 1C:
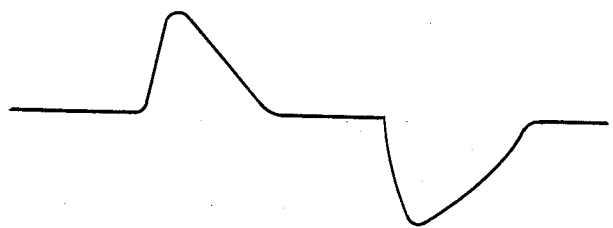

The pyroelectric infrared sensor is arranged to effect the temperature detection through the utilization of the pyroelectric effect as described above, and the functions thereof for the temperature detection will be described hereinbelow with reference to FIG. 1(a) which represents an input pulse of infrared rays, FIG. 1(b) which shows a state of coupling between a dipole and a floating charge within the pyroelectric member, and FIG. 1(c) which illustrates an output signal as detected by providing an electrode in the pyroelectric member. In a steady state, the output signal is zero without a variation of the surface charge as shown at b1, b3 and b5. Upon the projection of infrared rays thereonto, the pyroelectric member is slightly raised in its temperature, with a consequent distortion in the crystalline structure thereof, and thus, the arrangement of the dipoles is disturbed as shown at b2 to give rise to an unbalancing with respect to the coupled charge on the surface. The reaction as described above takes place very quickly, and the output signal appears instantaneously so as to be gradually decreased until the arrival at a fresh state of equilibrium b3. Accordingly, with respect to the continuous incidence of infrared rays at a predetermined intensity, the output immediately falls to zero after rising once, and upon the cutting off of the infrared rays, a reaction entirely contrary to the above takes place so as to provide an output signal with an opposite sign. In other words, the peak value of the output signal as described above corresponds to the incident infrared energy amount.

Since the output of the pyroelectric infrared sensor as described above becomes zero with respect to the continuous incidence of infrared rays at the predetermined intensity, it is necessary for the actual application thereof, to project infrared rays intermittently by providing a chopper mechanism. Furthermore, since the output in the above case becomes a relative temperature to be measured, in order to obtain the absolute temperature, it is required to correct the output of the infrared sensor through the measurement of the chopper temperature.

Hereinafter, construction of an infrared sensor unit to be employed in the temperature control arrangement according to the present invention will be described with reference to FIGS. 2 and 3.

Figure 2:
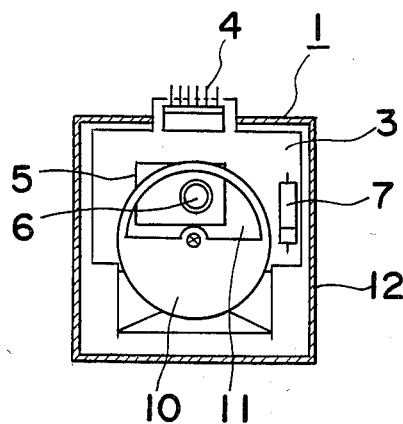
FIGS. 2 and 3 are front and side sectional views showing the internal construction of a pyroelectric infrared sensor unit which may be employed for a heat roller temperature control arrangement according to the present invention.
Figure 3:
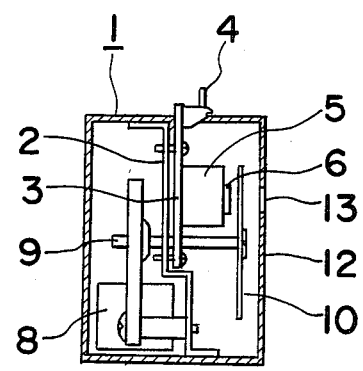

As shown in FIGS. 2 and 3, the infrared sensor unit 1 generally includes a casing or housing 12 of a metallic material which covers the entire unit, an intermediate plate 2 fixedly provided at approximately a central portion within the casing 12, a printed circuit board 3 secured to said intermediate plate 2, a pyroelectric infrared sensor 5 and a reference temperature measuring element 7 for the chopper temperature measurement which are mounted on said printed circuit board 3, a pulse motor 8 disposed at the bottom portion of the casing 12, and a chopper disc 10 formed with a semiconductor opening 11 and mounted on a rotary shaft 9 of the pulse motor 8 for intermittently intercepting the incident infrared rays. Since the pyroelectric infrared sensor 5 is readily affected by noise such as a wavering of the incident infrared rays, noise arising from the pulse motor 8, etc., the unit 1 is entirely covered by the metallic casing 12, to which a ground terminal (not shown) of the infrared sensor 5 is connected. Meanwhile, the input of the pulse motor 8, the input and output of the infrared sensor 5, and the input and output of the reference temperature measuring element 7 are respectively connected to external circuits (not particularly shown here) through terminals 4 fixed to the printed circuit board 3. In the above arrangement, infrared rays are directed into an incident opening 13 formed in the casing 12, and incident upon a light receiving portion 6 of the infrared sensor 5 through the semi-conductor opening 11 formed in the chopper disc 10.

Figure 4:
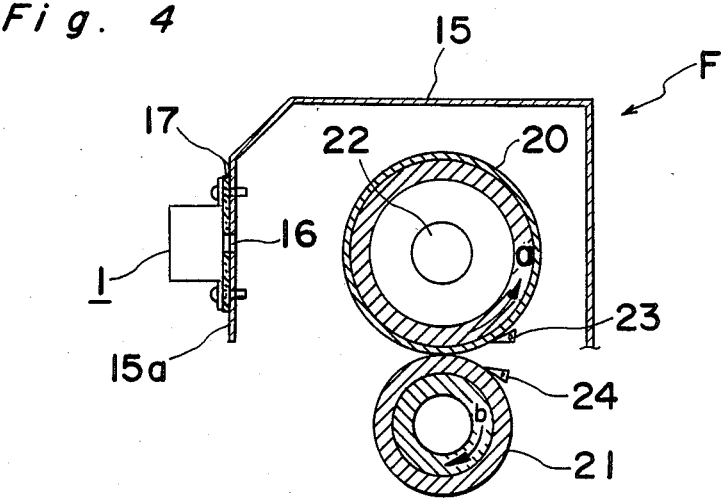
FIG. 4 is a fragmentary side sectional view showing a state of the pyroelectric infrared sensor unit of FIGS. 2 and 3 as mounted on a fixing device.

For installation, an infrared ray incident hole 16 is formed in one wall 15a of an outer casing 15 of a fixing device F, and the infrared sensor unit 1 having the construction as described so far is mounted on the outer face of said wall 15a in a position corresponding to the hole 16 through a heat insulating material 17 as shown in FIG. 4. The fixing device F includes an upper heat roller 20 with a heater element 22 incorporated therein. The roller 20 is driven for rotation in a direction indicated by an arrow a by a drive means (not shown), and a lower heat roller 21 held in pressure contact with the upper heat roller 20 is driven for rotation in a direction of an arrow b, following the rotation of said upper roller 20.

In contact with the surface of the upper and lower heat rollers 20 and 21, copy paper separating claws 23 and 24 are provided in a known manner.

The reason why the infrared sensor unit 1 is mounted on the outer wall 15a of the outer casing 15 of the fixing device F in the above described manner is to satisfy the requirements such as the restrictions in the ambient temperature for said unit 1 and the limitations in the temperature variation of the pyroelectric infrared sensor 5 itself with respect to time. Meanwhile, the heat insulating material 17 is inserted for preventing the temperature of the infrared sensor unit 1 from rising above the predetermined limitation by the influence of the upper heat roller 20.

Figure 5:
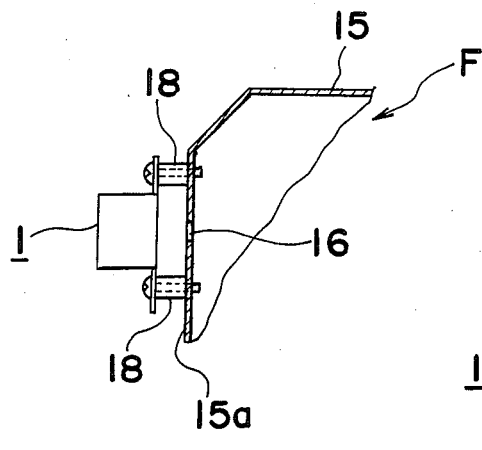
FIGS. 5 and 6 are views similar to FIG. 4, which particularly show modifications thereof.
Figure 6:
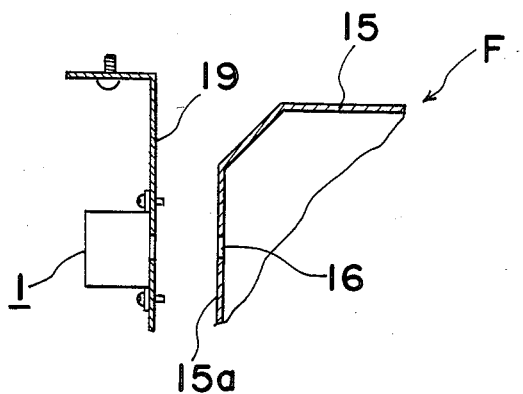

Meanwhile, for the prevention of temperature rise of the infrared sensor unit 1, the arrangement of FIG. 4 may be so modified that said sensor unit 1 is mounted on the wall 15a of the outer casing 15 through spacers 18 as shown in FIG. 5 or it may be mounted on a support bracket 19 provided in front of the wall 15a of the outer casing 15 in a spaced relation from the latter as illustrated in FIG. 6.

Figure 7:
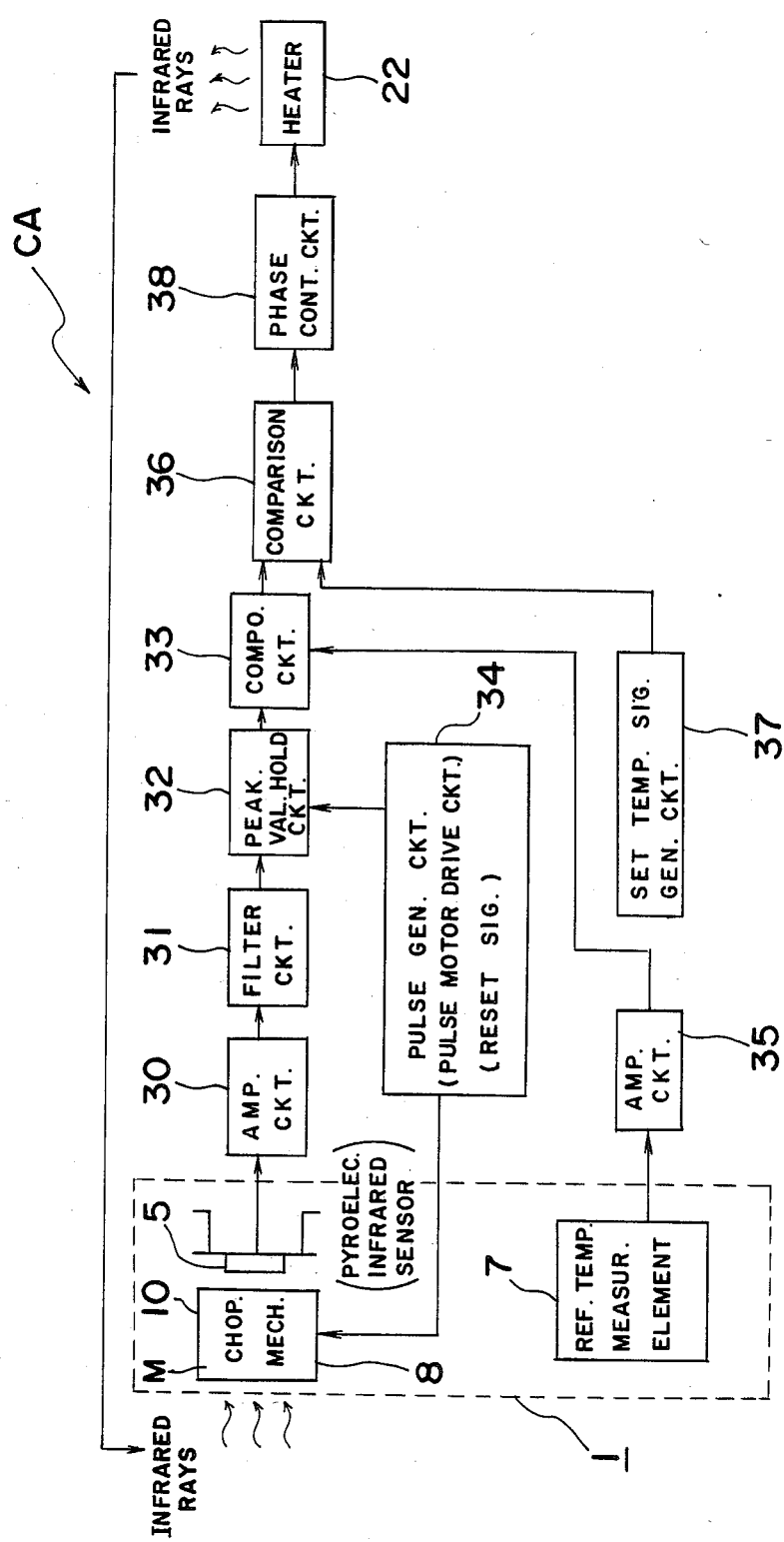
FIG. 7 is an electrical block diagram showing a circuit construction of a heat roller temperature control arrangement according to a first embodiment of the present invention.

Referring also to FIG. 7, a heat roller temperature control arrangement employing the infrared sensor unit 1 according to one preferred embodiment of the present invention will be described hereinbelow.

In FIG. 7, the temperature control circuit CA includes an amplification circuit 30 which is coupled to the pyroelectric infrared sensor 5 of the pyroelectric infrared sensor unit 1 which is surrounded by dotted lines. The output of the amplification circuit 30 is connected through a filter circuit 31 to a peak value holding circuit 32 which is further coupled to a chopper mechanism M via a pulse generation circuit 34; a composite circuit 33 is connected to the peak value holding circuit 32 and is connected to a reference temperature measuring element 7 through another amplification circuit 35; a comparison circuit 36 is connected to the composite circuit 33 and also to a set temperature signal generation circuit 37, and a phase control circuit 38 inserted between the comparison circuit 36 and the heater element 22 of the upper heat roller 20 (FIG. 4).

The amplification circuit 30 is arranged to amplify the output of the pyroelectric infrared sensor 5, while the filter circuit 31 separates the output of the amplification circuit 30 for selection. To the peak value holding circuit 32, a reset signal is supplied from the pulse generation circuit 34, while another output of the pulse generation circuit 34 is fed to a pulse motor 8 of the chopper mechanism M as a pulse motor driving signal. On the other hand, to the composite circuit 33, the output of the reference temperature measuring element 7 is supplied through the amplification circuit 35, together with the output of the peak value holding circuit 32.

The comparison circuit 36 is supplied with the output of the composite circuit 33 and the output of the set temperature signal generation circuit 37 for making a comparison therebetween. The set temperature signal generation circuit 37 produces a resistance divided potential signal for controlling the surface temperature of the upper heat roller 20 to a predetermined set temperature, and more specifically, to 165° C. The phase control circuit 38 receives the comparison signal from the comparison circuit 36 so as to turn on the heater element 22 when the output Vo of the composite circuit 33 is smaller than the set temperature divided potential, and to turn off the heater element 22 when said output Vo is equal to or larger than the set temperature divided potential.

In the temperature control arrangement CA as described so far, the pulse motor 8 is first rotated at a period $2t_1$ by the pulse motor drive signal (FIG. 8(a)) of the pulse generation circuit 34, and thus, infrared rays radiated from the surface of the upper heat roller 20 are intermittently incident upon the pyroelectric infrared sensor 5 through the rotation of the chopper disc 10. The output of the pyroelectric infrared sensor 5 responding to the above function is amplified by the amplification circuit 30, and after passing through the filter circuit 31, has a waveform as shown in FIG. 8(b).

Figure 9:
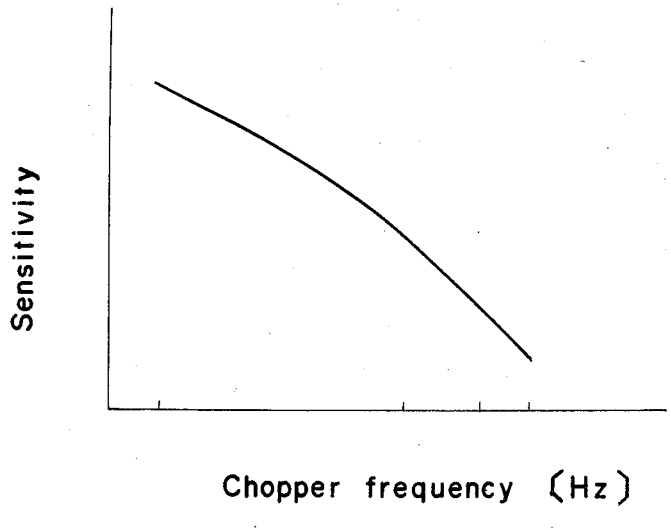
FIG. 9 is a graph for explaining the chopper frequency characteristics of the pyroelectric infrared sensor of FIGS. 2 and 3.

It should be noted here that the output of the pyroelectric infrared sensor 5 depends on the chopper frequency (i.e.—the rotational speed of the chopper disc 10), and the sensitivity is lowered as the chopper frequency (Hz) becomes higher as shown in FIG. 9. In the above embodiment, the chopper frequency (Hz) is set in the range of 1 to 3 Hz, but is not limited to such a range. It is also to be noted that the positive edge of the output of the pyroelectric infrared sensor 5 is delayed by td (FIG. 8(b)) with respect to the positive edge of the pulse motor driving signal by the mechanical delay in the rotation of the chopper disc 10.

Furthermore, the output signal S1 of the pyroelectric infrared sensor 5 becomes S1' as shown in FIG. 8(c) due to the peak value holding circuit 32 so as to be reset immediately before the positive edge of a subsequent output signal S2 based on the reset signal of the pulse generation circuit 34 described earlier. Similarly, output signals S2 and S3 are reset to S2' and S3', and the peak values are maintained subsequently in a similar manner. Meanwhile, the reset signal applied to the peak value holding circuit 32 is produced from the pulse generation circuit 34 by delaying the pulse motor drive signal by a time period td through an integration circuit (FIG. 8(d)).

Subsequently, upon the summation of a signal (FIG. 8(e)) which is obtained by amplifying the output of the reference temperature measuring element 7 through the amplification circuit 35, and the signal (FIG. 8(c)) from the peak value holding circuit 32 by the composite circuit 33, the surface temperature of the upper heat roller 20 which is the object to be measured is detected in the waveform as shown in FIG. 8(f). The output Vo (Vo=$V_S+V_D$) obtained here is compared with the set temperature divided potential $V_B$ of the set temperature signal generation circuit 37 by the comparison circuit 36, and the heater element 22 is turned on, if Vo>$V_B$, and turned off, if Vo<$V_B$, whereby the surface temperature of the upper heat roller 20 is maintained at the set temperature and more specifically, at the predetermined value of 165° C.

It should be noted here that, for the composition of the output of the reference temperature measuring element 7 and the output of the pyroelectric infrared sensor 5 by the composite circuit 33 as described above, it is necessary to equalize the output levels with respect to the temperature variations of both, and therefore, the gains of the amplification circuits 30 and 35 are preliminarily adjusted for use so that the output levels of the measuring element 7 and the infrared sensor 5 reach predetermined levels under the same conditions as the working circumstance, for example, 1.00 V output at 100° C.

It is also to be noted that, generally, in the case where the output of the infrared sensor does not have a linear characteristic, the linearization thereof is required. However, although the output of the pyroelectric infrared sensor employed in the present invention is proportional to the fourth power of the absolute temperature T, such an output is generally approximated to a linear form in the temperature control range of the heat roller of this kind.

It should further be noted that in the foregoing embodiment, although the temperature characteristic of a diode is utilized as the reference temperature measuring element 7, applications of the present invention are not limited to the above, but may be modified in various ways.

As is seen from the foregoing descriptions, according to the heat roller temperature control arrangement CA of the present invention, since an infrared sensor unit including a pyroelectric infrared sensor, chopper mechanism and reference temperature measuring heat sensitive element is employed, not only is the advantage of the non-contact type sensor available, without the soiling of the detecting portion and damage to the heat roller surface, but the disadvantages such as the adverse effect due to the atmosphere, etc., has been eliminated so as to make it possible to control the surface temperature of the heat roller to the predetermined value at all times.

Referring to FIGS. 10 through 13, a heat roller temperature control arrangement CB according to a second embodiment of the present invention will be described hereinbelow.

Since the principle and construction of the pyroelectric infrared sensor unit 1 are the same as those explained earlier with reference to the first embodiment of FIGS. 1 through 9, a detailed description thereof is abbreviated here for brevity, with like parts being designated by like reference numerals.

In the first place, it is to be noted that the second embodiment of FIGS. 10 to 13 intends to further eliminate inconveniences still present in the first embodiment, that is—due to the employment of the peak value holding circuit 32, the temperature detection value of the heat roller 20, as detected by the sensor unit 1, is affected so that a response for turning the heater element 22 on and off is delayed by the time constant of the peak value holding circuit 32 in the presence of a sudden temperature fall, and that if resetting is to be applied to the peak value holding circuit 32 is a predetermined period, not only is the circuit complicated, but the heater element 22 is turned on during the resetting period, thus resulting in a reduction of the temperature control characteristics.

In the embodiment of FIGS. 10 to 13, the temperature control circuit includes the amplification circuit 30 which is coupled to the pyroelectric infrared sensor 5 of the infrared sensor unit 1 and which is also connected through the low-pass filter circuit 31 to the composite circuit 33 which is further coupled to the reference temperature measuring circuit 7 of the infrared sensor unit 1 through another amplification circuit 35; the comparison circuit 36 is connected to the composite circuit 33 and is further connected to the heater element 22 through a latch circuit 32B and the phase control circuit 38; a microcomputer 40 has its terminal PO1 connected to the chopper mechanism M through the pulse motor drive circuit 34, and has its terminal PO2 connected to the comparison circuit 36 through the set temperature generation circuit 37, and also has its terminal PO3 connected to the latch circuit 32B so as to apply a clock pulse signal 39 to said latch circuit 32B, and further has its terminal PO4 connected to said latch circuit 32B for receiving a wait signal therefrom.

The amplification circuit 35 is arranged to amplify the output of the reference temperature measuring element 7, and the composite circuit 33 is adapted to compose the output of the filter circuit 31 and the output of the amplification circuit 35. The set temperature signal generation circuit 37 produces a signal for the set temperature resistance divided potential $V_{TH1}$ or $V_{TH2}$ for controlling the surface temperature of the upper heat roller 20 to a predetermined set temperature 175° C. (for thick paper) based on a set temperature signal level change-over signal for the thick copy paper and ordinary thickness copy paper from the microcomputer 40. The comparison circuit 36 is arranged to compare the output of the composite circuit 33 and the output of the set temperature signal generation circuit 37 for the generation of signal in the form of a high or low binary signal. The latch circuit 32B has for its object to retain the output of the comparison circuit 36 at the positive edge of the clock pulse signal 39, up to a subsequent clock pulse signal, while the phase control circuit 38 is adapted to produce heater signal for turning on the heater element 22 when the binary signal is "Low" and for turning it off when the binary signal is "High", based on said binary signal of the comparison circuit 36 retained by the latch circuit 32B.

Meanwhile, the rotation of the pulse motor 8 for the chopper disc 10 is controlled by the pulse motor drive signal 34 produced by clock pulses based on an internal timer (not shown) provided in the microcomputer 40, while the clock pulse signal 39 supplied to the latch circuit 32B is controlled by clock pulses based on the internal timer of said microcomputer 40.

Subsequently, the functioning of the heat roller temperature control arrangement CB according to the second embodiment of the present invention will be described hereinbelow.

The chopper disc 10 is first rotated at the period $2t_1$ as shown in FIG. 11(a) by the pulse motor drive signal 34 which is controlled by the microcomputer 40, and the infrared rays radiated from the surface of the upper heat roller 20 are intermittently incident upon the pyroelectric infrared sensor 5 through the rotation of the chopper disc 10, and the output of the pyroelectric infrared sensor 5 responding thereto is amplified at the amplification circuit 30 so as to be subsequently passed through the filter circuit 30 whose output is represented by $V_S$ while the output from the reference temperature measuring element 7 is amplified by the amplification circuit 35, the output of which is denoted by $V_D$. These outputs $V_S$ and $V_D$ are composed in the composite circuit 33, the output of which has a waveform as shown in FIG. 11(b) and is supplied to the comparison circuit 36.

The set temperature signal generation circuit 37 produces the set temperature resistance divided potential $V_{TH1}$ for the fixing of thick copy paper and the set temperature resistance divided potential $V_{TH2}$ for the fixing of ordinary thickness copy paper, based on the signal from the microcomputer 40 so as to be respectively supplied to the comparison circuit 36.

In the comparison circuit 36, the composite output and the set temperature resistance divided potential $V_{TH1}$ or $V_{TH2}$ are compared, and the output of the comparison circuit 36 is a low binary signal if $V_O < V_{TH1}$ or $V_O < V_{TH2}$, and is a high binary signal if $V_O = V_{TH1}$ or $V_O = V_{TH2}$. The output of the comparison circuit 36 is fed to the input of the latch circuit 32B (FIGS. 11(c) and 11(c')).

With regard to the clock pulse signal 39 which is fed to the latch circuit 32B, since the output of the infrared sensor unit 1 is delayed, i.e.—since the time required for the composite output Vo to reach the peak value is delayed by td', the clock pulse produced by the internal timer of the microcomputer 40 has a delay equivalent to this time td' (FIG. 11(d)).

By the above function, in the latch circuit 32B, the high or low output of the comparison circuit 36 at the positive edge of the clock pulse is retained up to the next clock pulse, and by the operation of the subsequent phase control circuit 38, the high or low binary signal becomes an on or off signal for the heater element 22 as shown in FIGS. 11(e) and 11(e'), and thus, the heater element 22 is controlled so that the surface of the upper heat roller 20 may be maintained at the predetermined value of 175° C. or 165° C.

Figure 12:
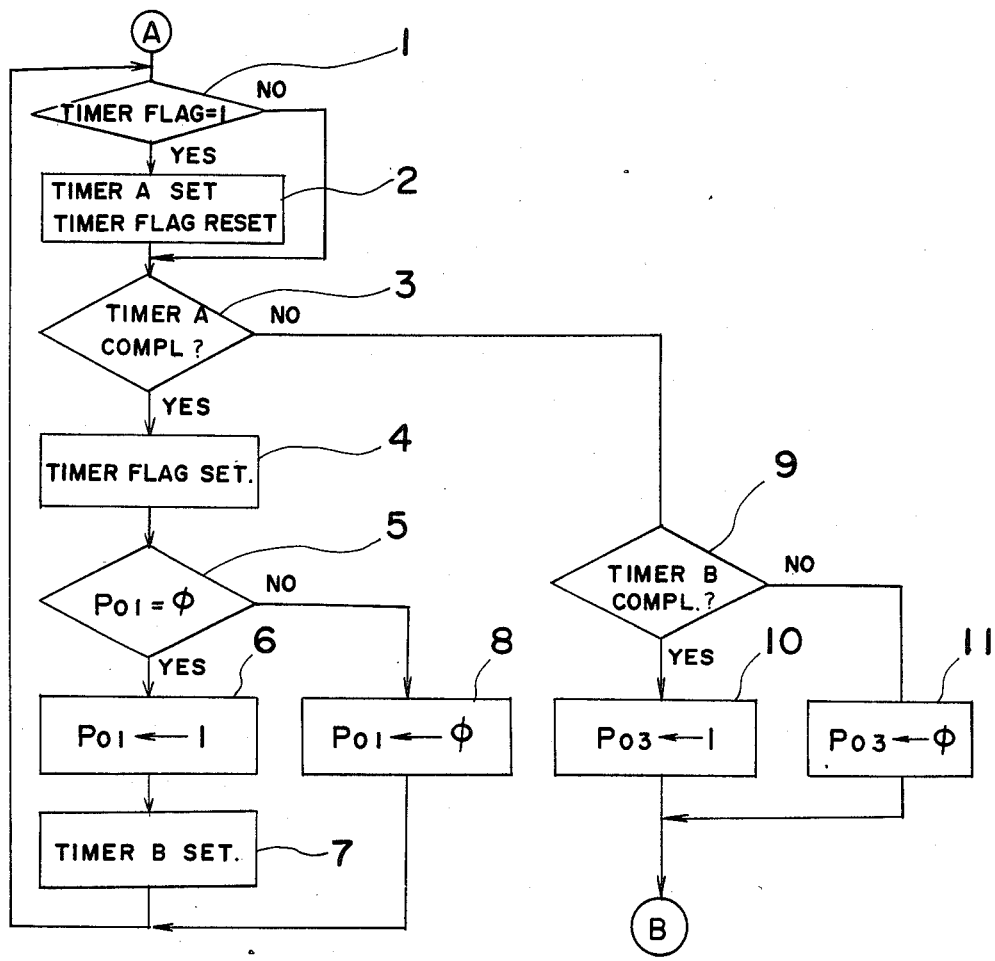
FIG. 12 is a flow-chart for explaining the functions of a microcomputer employed in the arrangement of FIG. 10.

Reference is made to a flow-chart for the microcomputer 40 shown in FIG. 12 which is related to the function in a period between turning on of a main switch and turning on of the heater element, and is not concerned with the control of the heater element.

Figure 10:
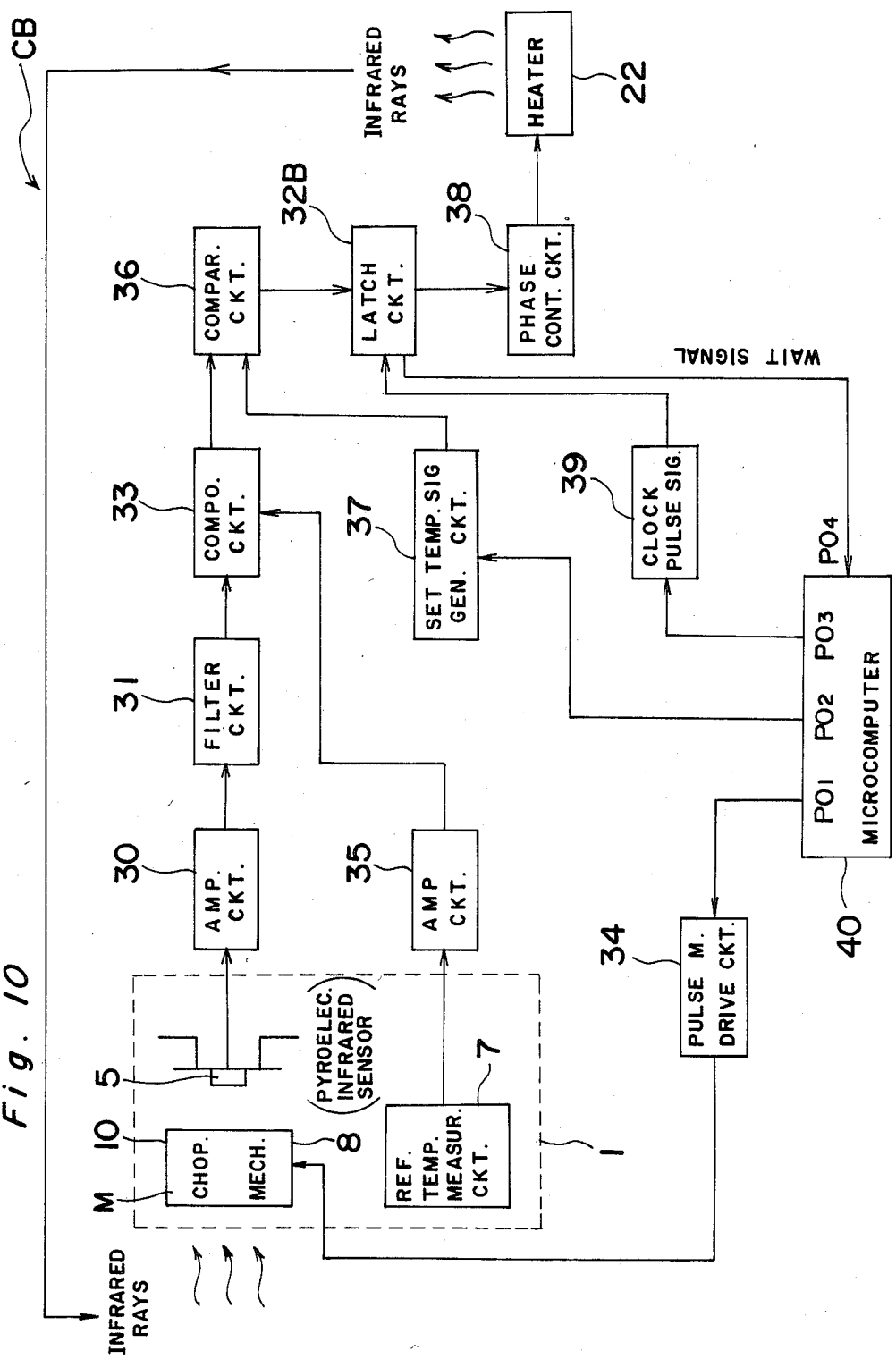
FIG. 10 is an electrical block diagram showing a circuit construction of a heat roller temperature control arrangement according to a second embodiment of the present invention.

It should be noted that in the second embodiment described so far, the microcomputer 40 is not directly related to the control of the heater element, and is arranged to produce a clock signal for the driving of the chopper motor, and to change-over the set temperature reference signal, and also to produce the latch timing signal for the signal passed through the comparison circuit 36, and further, to receive a wait completion signal at its terminal PO4 (FIG. 10).

In the flow-chart of FIG. 12, at a step 1, a determination is made as to whether or not the time flag is 1, and if the answer is "YES", then the step is shifted through a step 2 for timer A set and timer flag reset, to a step 3 to see if the timer A is completed, and if the answer at the step 1 is "NO", then the step is directly shifted to the step 3. If the answer is "YES" at the step 3, then the step is shifted through a step 4 for timer flag set to a step 5 to see if the relationship is PO1=φ. If the answer is "NO" at the step 3, then the step is shifted to a step 9 to see if the timer B is completed. In the case where the answer is "YES" at the step 9, then the step proceeds to (B) through a step 10, while, if the answer is "NO" at the step 9, then the step proceeds to (B) through a step 11. Meanwhile, if the answer if "YES" at the step 5, then the step reverts to (A) through steps 6 and 7, and if the answer is "NO" at the step 5, then the step is shifted to the step 7 through a step 8.

In FIG. 12, when the main switch (not shown) is turned on, with a timer flag being 1 (step 1), upon the setting of the timer A (step 2), the microcomputer 40 produces, at its terminal PO1, the pulse motor drive signal 34 of a "High" or "Low" level at the time interval of tl as shown in FIG. 11(a) for driving the pulse motor 8.

Upon the completion of the timer A (step 3), with the signal of the terminal PO1 being "Low", the timer B is set (step 7) at a timing for the terminal PO1 to produce the "High" output, and if the time td' is completed before the completion of the timer A (step 9), then the clock pulse signal 39 of a "High" level is produced from the terminal PO3 as shown in FIG. 11(d).

Figure 13:
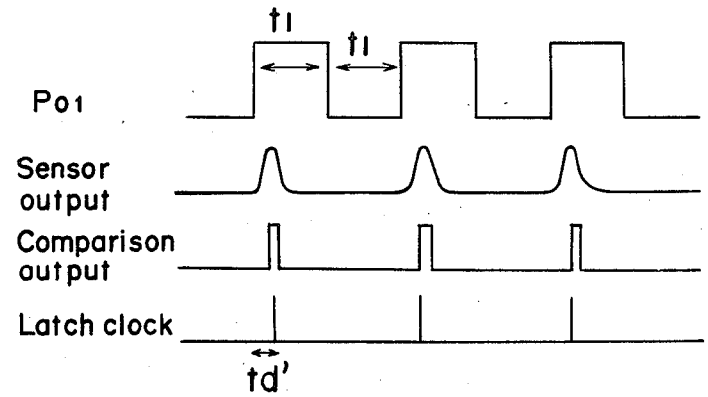
FIG. 13 is a waveform diagram for further explaining the functioning of the arrangement of FIG. 10.

More specifically, as shown in FIG. 13, the microcomputer 40 produces a "High" or "Low" pulse from its terminal PO1 for driving the pulse motor 8 for the chopper disc 10 at the interval of time $t_1$, and at the timing for producing 1 at the terminal PO1 thereof, effects the delay by the time td', and after a lapse of the time td', produces a clock pulse for the latching.

As is seen from the foregoing description, the heat roller temperature control arrangement CB according to the second embodiment of the present invention includes the infrared sensor unit, the composing means for composing the temperature value of the heat roller detected by the pyroelectric infrared sensor and the temperature value of the chopper mechanism detected by the reference temperature measuring heat-sensitive element, the set temperature signal generating means for the heat roller, the comparing means for comparing the temperature detected value composed by the composing means and the set temperature signal from the set temperature signal generating means, the latch means for holding the comparison signal from said comparing means at the positive edge of the clock signal, and the control means for subjecting the heater of the heat roller to on/off control based on the comparison signal retained by said latch means, wihout employment of the peak value holding circuit as in the first embodiment, and therefore, in addition to the advantages available by the first embodiment, resetting for each period becomes unnecesary, and favorable temperature control characteristics may be obtained without a complication of the circuit arrangement.

Figure 14:
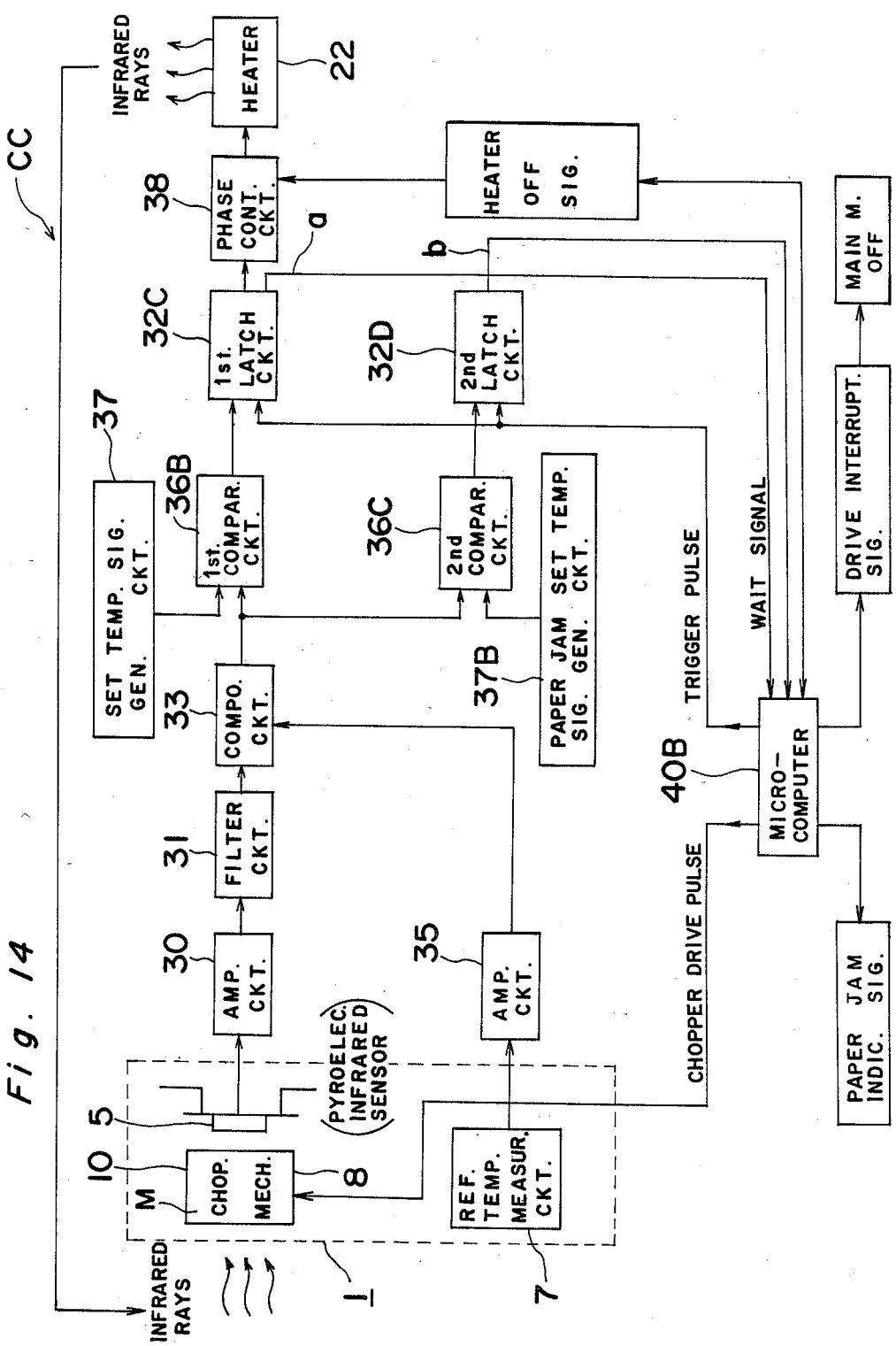
FIG. 14 is an electrical block diagram showing a circuit construction of a heat roller temperature control arrangement according to a third embodiment of the present invention.

Referring to FIGS. 14 to 16(b), there is shown in FIG. 14 a heat roller temperature control arrangement CC according to a third embodiment of the present invention, which is provided with a function for positively detecting copy paper jamming within the fixing device in addition to the capability for controlling the surface temperature of the heat roller at a predetermined value at all times as in the first and second embodiments described so far. The heat roller temperature control arrangement CC according to the third embodiment of the present invention is provided with a copy paper jamming set temperature signal generating means for the heat roller, a comparing means for comparing the temperature value of the heat roller as detected by the infrared sensor unit and the copy paper jamming set temperature signal from said generating means, and a copy paper jamming detecting means for detecting copy paper jamming based on the function of the comparing means so as to detect the copy paper jamming within the fixing device, in addition to the mechanism for the on/off control of the heater element for the heat roller through employment of the infrared sensor unit for a means to detect the surface temperature of the heat roller as described earlier.

More specifically, as shown in FIG. 14, the temperature control circuit according to the third embodiment generally includes the amplification circuit 30 which is coupled to the pyroelectric infrared sensor 5 of the infrared sensor unit 1 and is also connected through the filter 31 to the composite circuit 33 which is further coupled to the reference temperature measuring circuit 7 of the infrared sensor unit 1 through another amplification circuit 35; a first comparison circuit 36B is connected to the composite circuit 33 and is also connected to the set temperature signal generation circuit 37 and still further connected to the heater element 22 through a first latch circuit 32C and the phase control circuit 38; a second comparison circuit 36C is connected to the composite circuit 33 and a paper jamming set temperature signal generation circuit 37B and is also connected to a second latch ciruit 32D which is further coupled to a microcomputer 40B which is connected to said first latch circuit 32C for enabling the reception of a wait signal; said microcomputer 40B is further coupled to the pulse motor 8 of the chopper mechanism M and the phase control circuit 38 for enabling the application of signals in the manner as described hereinbelow.

In the above circuit construction, the first comparison circuit 36B is supplied with the output of the composite circuit 33 and the output of the set temperature signal generation circuit 37 for effecting a comparison therebetween. The set temperature signal generation circuit 37 produces the resistance divided potential signal for controlling the surface temperature of the upper heat roller 20 to the predetermined set temperature, and more specifically, to 165° C.

The first latch circuit 32C is supplied with the output of the first comparison circuit 36B and trigger pulse produced from the microcomputer 40B so as to retain the output of the first comparison circuit 36B at the positive edge of the trigger pulse. The phase control circuit 38 which is supplied with the signal from the first latch circuit 32C is arranged to turn on the heater element 22 when the output Vo of the composite circuit 33 is smaller than the set temperature signal $V_{TH}$, and to turn it off when said output Vo is equal to or larger than the set temperature signal $V_{TH}$. The output of the first latch circuit 32C is supplied to the microcomputer 40B as indicated by "a". The chopper drive signal produced by said microcomputer 40B is supplied to the pulse motor 8 of the chopper mechanism M.

On the other hand, the second comparison circuit 36C is supplied with the output of the composite circuit 33 and the output of the paper jamming set temperature signal generation circuit 37B for effecting a comparison therebetween. More specifically, if the copy paper should be wound onto the upper heat roller 20 or jammed in a position prior to the rollers 20 and 21, infrared rays radiated from the upper heat roller 20 towards the pyroelectric infrared sensor 5 are reduced, with a consequent reduction in the output of the pyroelectric infrared sensor 5, and the paper jamming set temperature signal generation circuit 37B produces the resistance divided potential signal equivalent to the output reduced in the above described manner.

The second latch circuit 32D is supplied with the output of the second comparison circuit 36C and the trigger pulse produced by the microcomputer 40B so as to retain the output of the second comparison circuit 36C at the positive edge of the trigger pulse. Meanwhile, the output of the second latch circuit 32D is supplied to the microcomputer 40B as indicated by "b", which supplies a heater off signal to the phase control circuit 38 so as to turn off the heater element 22 when the output Vo of the composite circuit 33 is smaller than the paper jamming set temperature signal $V'_{TH}$, and simultaneously produces a paper jamming indication signal to illuminate an indicator lamp on a control panel (not shown), and a driving interruption signal used to turn off a main motor.

It should be noted there that, during the power-on period, although the copy paper jamming signal is produced from the second latch circuit 32D, the heater element 22 is once turned off. In other words, it is so arranged that, until the waiting state is terminated, the paper jamming indication signal, heater off signal, and main motor off signal are not produced by the microcomputer 40B.

In the above circuit construction, in the first place, the pulse motor 8 is rotated at a predetermined rate by the chopper drive pulse produced by the microcomputer 40B, and the infrared rays radiated from the upper surface of the upper heat roller 20 are intermittently incident upon the pyroelectric infrared sensor 5 through rotation of the chopper disc 10, and the output of the pyroelectric infrared sensor 5 responding thereto is amplified by the amplification circuit 30 so as to subsequently pass through the filter circuit 31. Meanwhile, the output of the reference temperature measuring element 7 is amplified by the amplification circuit 35 so as to be combined with the output of the filter circuit 31 by the composite circuit 33 for composition, the resultant waveform of which is shown in FIG. 15(a).

The output Vo of the composite circuit 33 is compared with the output $V_{TH}$ of the generation circuit 37 by the first comparison circuit 36B, and is produced from the first comparison circuit 36B with a waveform as shown in FIG. 15(b) so as to be retained by the first latch circuit 32C at the positive edge of the trigger pulse, which is produced by the microcomputer 40B in correspondence with a slight delay of the peak value in the output of the pyroelectric infrared sensor 5 with respect to the positive edge of the chopper driving pulse, (i.e.—a mechanical delay in the rotation of the chopper disc 10).

Thus, if the output Vo of the composite circuit 33 and the output $V_{TH}$ of the generation circuit 37 (i.e.—the set temperature signal) have the relationship $Vo < V_{TH}$, the heater element 22 is turned on, and if $Vo \geq V_{TH}$, the heater element 22 is turned off, whereby surface temperature of the upper heat roller 20 is maintained at the set temperature and more specifically, at the predetermined value of 165° C.

Moreover, the output Vo of the composite circuit 33 is also supplied to the second comparison circuit 36C for comparison thereat with the output $V'_{TH}$ of another generation circuit 37B so as to produce an output from the second comparison circuit 36C having a waveform as shown in FIG. 15(d) which is retained by the second latch circuit 32D at the positive edge of the trigger pulse. When the output Vo of the composite circuit 33 is smaller than the output $V'_{TH}$ of the generation circuit 37B (i.e.—a paper jamming set temperature signal), this indicates that infrared rays incident upon the pyroelectric infrared sensor 5 are rapidly reduced due to paper jamming taking place in the fixing device. When the above paper jamming signal if supplied to the microcomputer 40B, the heater off signal is produced by said microcomputer 40B and fed to the phase control circuit 38 to turn off the heater element 22, with the simultaneous generation of the paper jamming indication signal and the drive interruption signal.

Figure 16A:
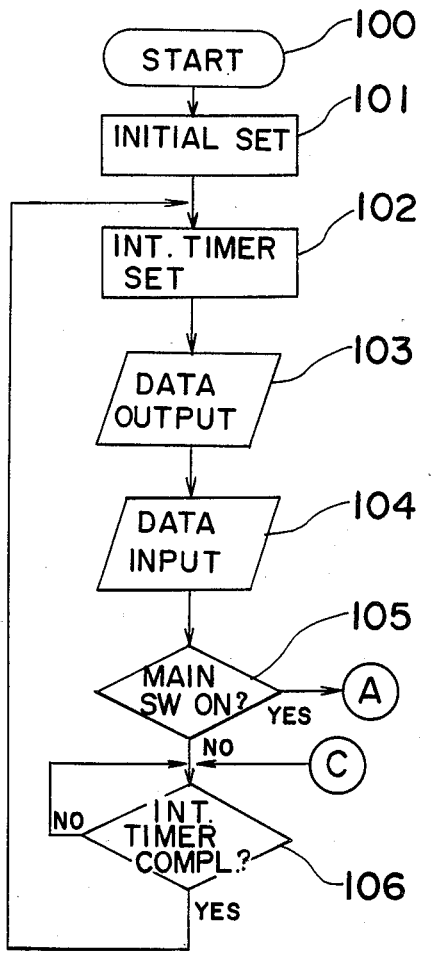
FIGS. 16(a) to 16(b) are flow-charts for explaining the functioning of the arrangement of FIG. 14.
Figure 16B:
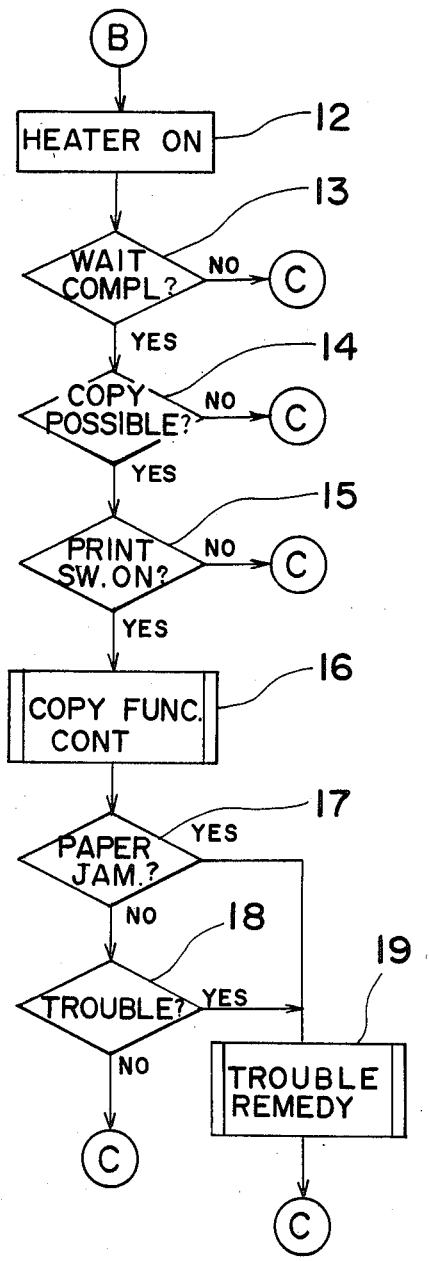

Referring also to flow-chart in FIGS. 16(a) and 16(b) in which the same portion as in FIG. 12 is omitted, upon starting at a step 100 in FIG. 16(a), steps are shifted, through a step 101 for initial setting, a step 102 for internal timer setting, a step 103 for data output, and a step 104 for data input, to a step 105 where a determination is made as to whether or not the main switch is on, and if the answer is "YES" at the step 105, then the step proceeds to (A) (FIG. 12), while if the answer is "NO", then the step is shifted to a step 106 to see if the internal timer is completed. If the answer is "YES" at the step 106, then the step if reverted to the step 102.

Meanwhile, in the flow-chart in FIG. 16(b), the heater is turned on (step 12) upon the turning on of the main switch (wait signal check), and the step is shifted to a step 13 where a determination is made as to whether or not the wait is completed, and if "YES" at the step 13, then the step proceeds to a step 14 to see if the copying is possible, and if the answer is "YES" at the step 14, then the step is shifted to a step 15 for a determination as to whether or not the print switch is turned on. In the above steps 13, 14, and 15, if the answers are "NO", then the step is transferred to (C) (FIG. 16(a)). When the answer is "YES" at the step 15, then the step proceeds, through a step 16 for copy function control, to a step 17 for a determination as to whether or not copy paper jamming is present, and if the answer is "YES" at the step 17, then the step is shifted through a step 19 for trouble remedy to (C), while, if the answer is "NO" at the step 17, then the step is shifted to a step 18 for a determination as to whether or not any trouble is present. If the determination is "YES" at the step 18, then the step if shifted to (C) through the step 19, while, if the answer is "NO" at the step 18, then the step is directly shifted to (C).

As is seen from the foregoing description, since the heat roller temperature control arrangement CC according to the third embodiment of the present invention is provided with the copy paper jamming set temperature signal generating means for the heat roller, the comparing means for comparing the temperature value of the heat roller as detected by the infrared sensor unit and the copy paper jamming set temperature signal from said generating means, and the copy paper jamming detecting means for detecting copy paper jamming based on the function of the comparing means so as to detect the copy paper jamming within the fixing device, besides the mechanism for the on/off control of the heater element for the heat roller through employment of the infrared sensor unit for detecting the surface temperature of the heat roller controlled so as to be at a predetermined value at all times, but also the copy paper jamming within the fixing device may be positively detected, and moreover, owing to the fact that the temperature detection element can be simultaneously used for the paper jamming detection element, a reduction of cost can be achieved, without any problems related to faulty contact, heat resistance, etc. as in microswitches, photo-interrupters and the like which are conventionally used for paper jamming detecting elements.

Figure 17:
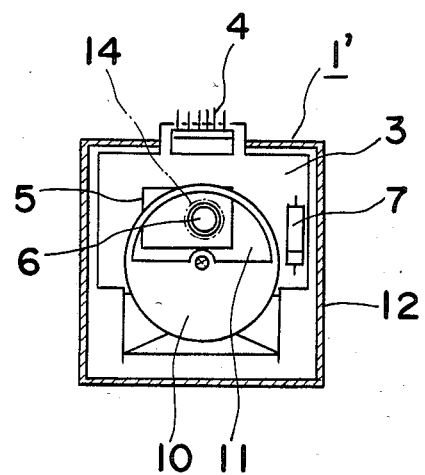
FIGS. 17 and 18 are views similar to FIGS. 2 and 3, particularly show modifications thereof.
Figure 18:
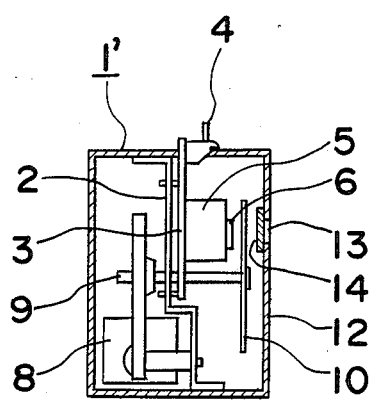

Referring to FIGS. 17 and 18, there is shown a modification of the infrared sensor unit 1 of FIGS. 2 and 3, which may be applied, for example, to the heat roller temperature control arrangement CA of the first embodiment described earlier with reference to FIG. 7.

In the modification of FIGS. 17 and 18, the infrared sensor unit 1' having generally the same construction as that in the infrared sensor unit 1 described previously with reference to FIGS. 2 and 3, if further provided with an infrared ray transmitting filter 14 applied onto the inner wall of the infrared ray incident opening 13 formed in the casing 12 as is most clearly seen in FIG. 18. The filter 14 as desribed above allows to pass therethrough, only the infrared rays necessary for the infrared sensor 5 to detect the temperatures, while cutting off other heat wages, and functions to prevent abnormal rise of the reference temperature measured by the measuring element 7 due to rapid entry of heat waves into the casing 12 through the incident opening 13, and consequent erroneous detection of the surface temperature of the upper heat roller 20. Furthermore, since the filter 14 also has a function to prevent scattering toner and vapor of a fixing oil, etc. from entering the casing 12, soiling of the light receiving portion 6 of the sensor 5 may be advantageously prevented.

It should be noted here that, for obtaining the same effect as that of the above filter 14, there may be conceived such measures as minimizing the incident opening 13 as far as possible (i.e.—stopping down of aperture) or spacing of the sensor unit 1 from the fixing device, etc., but such measures are inevitably limited from the viewpoint of proper function.

In the above arrangement, the infrared rays are introduced into the casing 12 via the incident opening 13 of the casing 12 through the filter 14, and are incident upon the light receiving portion 6 of the infrared sensor 5 via the opening 11 of the chopper disc 10.

Since other construction and effects of the heat roller temperature control arrangement employing the sensor unit 1' of FIGS. 17 and 18 may be generally similar to those of the first embodiment described earlier with reference to FIGS. 1 through 8, detailed description thereof is abbreviated here for brevity.

It is needless to say that the modified sensor unit 1' may also be applied to the heat roller temperature control arrangements of the second and third embodiments of the present invention described so far.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be constructed as included therein.

What is claimed is:

1. A temperature control arrangement for a heat roller which comprises an infrared sensor unit disposed in the vicinity of the heat roller and including a pyroelectric infrared sensor; a chopper mechanism and a reference temperature measuring heat sensitive element; a set temperature signal generating means for the heat roller; a comparing means for comparing a temperature detection value of the heat roller as detected by said sensor unit with the set temperature signal from said set temperature signal generating means; a control means for subjecting a heater element of said heat roller to on/off control based on a comparison signal of said comparing means; a composing means for composing the temperature detection value of the heat roller as detected by the pyroelectric infrared sensor and a temperature detection value of said chopper mechanism as detected by said reference temperature measuring heat sensitive element, said comparing means being arranged to compare said temperature detection value after said value has been composed by said composing means with the set temperature signal from said set temperature signal generating means of the heat roller; and a latch means for holding said comparison signal from said comparing means at a positive edge of clock pulse signal, said control means being arranged to subject the heater element of the heat roller to the on/off control based on said comparison signal held by said latch means.

2. A temperature control arrangement as claimed in claim 1, further comprising a paper jamming set temperature signal generating means for the heat roller, a second comparing means for comparing the temperature detection value of the heat roller as detected by said sensor unit with the paper jamming set temperature signal from said paper jamming set temperature signal generating means, and a paper jamming detecting means for detecting paper jamming based on the functioning of said second comparing means.

3. A temperature control arrangement as claimed in claim 1, wherein said infrared sensor unit further includes an infrared ray transmitting filter provided on an infrared ray incident opening formed in a casing of said sensor unit so that infrared rays are incident upon said pyroelectric infrared sensor through said infrared ray transmitting filter.

4. A temperature control arrangement as claimed in claim 1, wherein said infrared sensor unit is disposed outside a wall of a casing for a fixing device in which said heat roller is rotatably mounted, and in a position adjacent to an infrared ray incident hole formed in said wall located in the vicinity of said heat roller.

5. A temperature control arrangement as claimed in claim 4, wherein said infrared sensor unit is disposed adjacent to said wall through an insulating member.

6. A temperature control arrangement as claimed in claim 4, wherein said infrared sensor unit is disposed adjacent to said wall through spacers.

7. A temperature control arrangement as claimed in claim 4, wherein said infrared sensor unit is disposed adjacent to said wall on a support bracket separately provided close to said wall.

8. A temperature control arrangement for a heat roller which comprises an infrared sensor unit disposed in the vicinity of the heat roller and including a pyroelectric infrared sensor; a chopper mechanism and a reference temperature measuring heat sensitive element; a set temperature signal generating means for the heat roller; a comparing means for comparing a temperature detection value of the heat roller as detected by said sensor unit with the set temperature signal from said set temperature signal generating means; a composing means for composing the temperature detection value of the heat roller as detected by the pyroelectric infrared sensor and a temperature detection value of said chopper mechanism as detected by said reference temperature measuring heat sensitive element, said comparing means being arranged to compare said temperature detection value after said value has been composed by said composing means with the set temperature signal from said set temperature signal generating means of the heat roller; a control means for subjecting a heater element of said heat roller to on/off control based on a comparison signal of said comparing means; wherein said heat sensitive element is disposed within the interior of a casing having said infrared sensor unit contained therein.

9. A temperature control arrangement as claimed in claim 8, further comprising an electrical filter circuit connected to and arranged between said pyroelectric infrared sensor and said composing means for passing a frequency limited portion of an output of said pyroelectric sensor means and still further comprising a latch circuit connected to said electrical filter circuit and a pulse generating circuit connected to both said chopper mechanism and said latch means, wherein said latch means stores a peak value of an output of said electrical filter in response to a pluse from said pulse generating means and wherein said chopper mechanism is operated in response to another pulse from said pulse generating means.

10. A temperature control arrangement as claimed in claim 8, further comprising a paper jamming set temperature signal generating means for the heat roller, a second comparing means for comparing the temperature detection value of the heat roller as detected by said sensor unit with the paper jamming set temperature signal from said paper jamming set temperature signal generating means, and a paper jamming detecting means for detecting paper jamming based on the functioning of said second comparing means.

11. A temperature control arrangement as claimed in claim 8, wherein said infrared sensor unit further includes an infrared ray transmitting filter provided on an infrared ray incident opening formed in a casing of said sensor unit so that infrared rays are incident upon said pyroelectric infrared sensor through said infrared ray transmitting filter, said filter transmitting only infrared rays used for temperature detection by said pyroelectric infrared sensor and blocking all other infrared rays.

12. A temperature control arrangement as claimed in claim 8, wherein said infrared sensor unit is disposed outside a wall of a casing for a fixing device in which said heat roller is rotatably mounted, and in a position adjacent to an infrared ray incident hole formed in said wall located in the vicinity of said heat roller.

13. A temperature control arrangement as claimed in claim 12, wherein said infrared sensor unit is disposed adjacent to said wall through an insulating member for preventing a temperature rise in said infrared sensor unit.

14. A temperature control arrangement as claimed in claim 12, wherein said infrared sensor unit is disposed adjacent to said wall through spacers for preventing a temperature rise in said infrared sensor unit.

15. A temperature control arrangement as claimed in claim 12, wherein said infrared sensor unit is disposed adjacent to said wall on a support bracket separately provided close to said wall.

* * * * *